Nov. 21, 1961  B. MALONEY ET AL  3,009,544
UNIT BRAKE ARRANGEMENT
Filed May 29, 1958  2 Sheets-Sheet 1
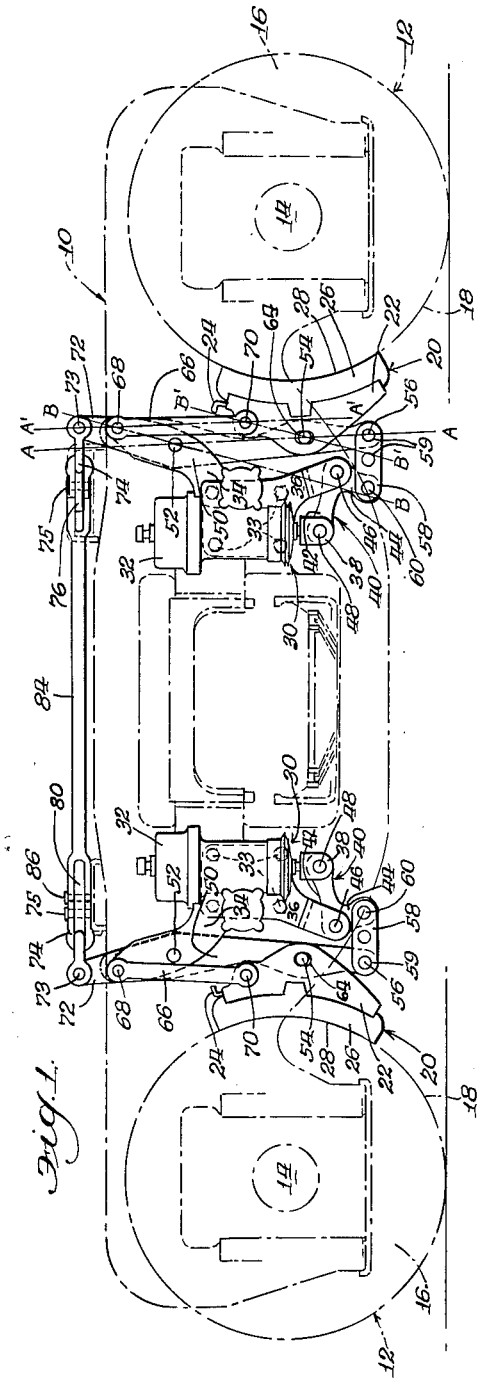
INVENTORS.
Bernard Maloney
Walter R. Polanin
By Walter L. Schlegel, Jr.
Atty.
Witness:
Richard W. Carpenter Nov. 21, 1961     B. MALONEY ET AL     3,009,544

UNIT BRAKE ARRANGEMENT

Filed May 29, 1958     2 Sheets-Sheet 2

Witness:
Richard W. Carpenter

INVENTORS.
Bernard Maloney
Walter R. Polanin

By Walter L. Schlegel, Jr.
Atty.

United States Patent Office 3,009,544
Patented Nov. 21, 1961

3,009,544
UNIT BRAKE ARRANGEMENT
Bernard Maloney, Gary, Ind., and Walter R. Polanin, Chicago, Ill., assignors to American Steel Foundries, Chicago, Ill., a corporation of New Jersey
Filed May 29, 1958, Ser. No. 738,726
8 Claims. (Cl. 188—52)

This invention relates to brake arrangements and more particularly to brake arrangements for railway vehicles. The invention comprehends a self-contained brake mechanism of the type adapted to be demountably applied to a vehicle.

It is, therefore, an object of this invention to provide a self-contained brake structure which can be readily secured to or detached from the frame of a vehicle.

Another object of the invention is the provision of a self-contained brake arrangement wherein all of the linkage is pivoted to or carried by a power cylinder assembly housing structure which can be detachably mounted on a vehicle frame.

Still another object of the invention is to provide a self-contained brake arrangement including means to transmit brake torque from the brake shoe assemblies to the vehicle frame through the brake power cylinder structure.

A more specific object of the invention is the provision of a self-contained brake arrangement having brake actuating elements arranged to present a linkage parallelogram adapted to maintain parallelism between co-engaging friction surfaces and thereby minimize unequal wearing of the brake shoes.

Yet another object of the invention is to provide a self-contained brake arrangement wherein the brake lever can be actuated either manually or by a power cylinder.

Another more specific object of the invention is to provide a self-contained brake arrangement with a hand brake linkage system wherein a brake lever can be actuated by power means applied to one end of the lever or by manual force applied to the lever at some other point.

These and other objects of the invention will be apparent from an examination of the following description and drawings, wherein:

FIGURE 1 is a side elevational view of a railway car truck to which has been applied a self-contained brake embodying features of the invention;

FIGURE 2 is a top plan view of the structure illustrated in FIGURE 1, only one side of the truck being shown as the opposite side may be provided with a similar brake arrangement;

Figure 3:
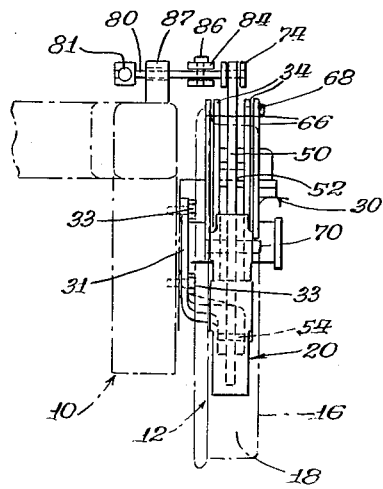
FIGURE 3 is an end elevational view of the structure illustrated in FIGURE 2.
Figure 4:
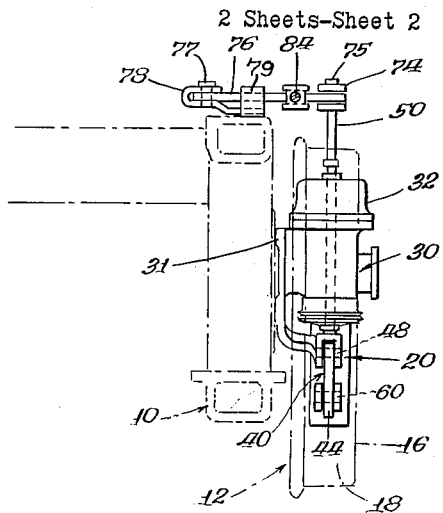
FIGURE 4 is a fragmentary transverse vertical sectional view taken approximately through the center of FIGURE 1, and FIGURES 5 and 6 are views similar to FIGURE 1, but illustrate modified forms of the invention, in each view only the brake arrangement associated with one wheel is shown as the other wheels may be provided with similar arrangements.

It will be understood that some elements have been intentionally omitted from certain views where they are illustrated to better advantage in other views.

Referring now to the drawings for a better understanding of the invention, and first to FIGURES 1-4, it will be seen that the novel brake arrangement embodying features of the invention is applied to a railway car truck comprising a truck frame, indicated generally at 10, supported by a pair of wheel and axle assemblies, indicated generally at 12, each including an axle 14 having a pair of wheels 16 (only one of which is shown) each presenting rotatable friction surfaces 18.

Disposed adjacent each wheel 16 is a brake shoe assembly, indicated generally at 20, comprising a brake head 22, to which may be detachable secured in a conventional manner, as by a key 24, a brake shoe 26 presenting a brake shoe surface 28 engageable with friction surface 18 of the related wheel.

The brake actuating mechanism for each brake shoe assembly comprises a combination power cylinder-slack adjuster assembly structure, indicated generally at 30, which includes a housing 32, presenting on its inboard side a vertical mounting plate or flange 31, detachably mounted to the outboard side of the truck frame 10 in any desired manner, as by means of a plurality of nut and bolt assemblies 33, adjacent the related wheel and brake shoe assembly. Housing 32 may be provided with upper and lower pairs of arms 34 and 36, respectively, which are disposed to extend toward the related wheel 16.

The structural details of the power cylinder and slack adjuster mechanism disposed within each housing 32 are not shown in detail as they do not comprise an essential feature of this invention, but they may be of the type disclosed in a copending patent application, Serial No. 730,353, filed April 23, 1958 in the name of Walter R. Polanin.

A dead bell crank cylinder lever 40 comprising a pair of angularly related arms 42 and 44 may be fulcrumed to the lower housing arms 36 by a fulcrum pin 46 for rotative movement relative to the housing in a generally vertical plane. At its inner extremity, cylinder lever arm 42 may be pivotally connected by a pin 48 to one end of a piston rod 38, the other end of which is disposed within the housing and connected to a power cylinder piston (not shown).

Located between the housing and the related wheel is a generally vertically extending dead brake lever 50 fulcrumed inwardly adjacent its upper extremity by a pin 52 to housing upper arm 34 and pivotally connected intermediate its ends by a pin 54 to brake head 22. At its lower extremity, dead brake lever 50 may be pivotally connected by a pin 56 to one end of a link 58, the other end of which is pivotally connected by a pin 60 to arm 44 of cylinder lever 40. Link 58 may be provided with a plurality of pin holes 59 to accommodate an adjustable connection between the brake and cylinder levers.

As best seen in FIGURE 1, pin 54, which serves to pivotally interconnect the brake lever and the brake shoe assembly, is disposed to extend through a preferably round aperture or pin hole presented by the brake head and a preferably elongated slot or pin hole 64 presented by the brake lever in order to permit limited lineal movement between the brake shoe assembly and the brake lever. The reason for this slotted connection will be explained later in the specification in connection with the operation of the device.

In order to transmit brake torque, resulting from the rotation of the wheel, from each brake shoe assembly through the housing to the truck frame there may be provided a torque link 66 pivotally connected at its upper and lower ends by pins 68 and 70 to th housing arms 34 and brake head 22, respectively.

Still referring to FIGURE 1, it will be seen that pins 52 and 54 pivotally connecting brake lever 50 to housing arms 34 and brake head 22, respectively, lie within or define a plane, indicated by the line A—A, which extends generally parallel to a plane, indicated by the line A'—A', defined by the pins 68 and 70 which pivotally connect torque link 66 to housing arms 34 and brake head 22, respectively; also, pins 52 and 68 which pivotally connect housing arms 34 to brake lever 50 and torque link 66, respectively, lie within or define a plane, indicated by the line B—B, which extends generally parallel to a plane, indicated by the line B'—B', defined by pins 54 and 70 which pivotally connect brake head 22 to brake lever 50 and torque link 66, respectively. Thus, the four pivotal connections are arranged and disposed to provide a linkage parallelogram arrangement between housing arms 34, brake head 22, brake lever 50, and torque link 66, whereby as brake shoe assembly 20 is urged into engagement with the wheel by the power cylinder, in a manner hereinafter described, the brake surface 28 of brake shoe 26 will be maintained in substantial alignment with and parallel to friction surface 18 of wheel 16 at all times.

Actuation of the brake mechanism at the right hand side of FIGURE 1 is effected by means of the dead bell crank cylinder lever 40 which is rotated counterclockwise about pin 46 by the movement of power cylinder piston rod 38. As the cylinder lever rotates in a counterclockwise direction, it causes the lower extremity of brake lever 50, which is fulcrumed inwardly adjacent its upper end by pin 52 to housing arms 34, to move to the right, and bring brake shoe assembly 20 into engagement with friction surface 18 of the adjacent right hand wheel.

In addition to its function as a torque transmitting means, link 66 also serves two other purposes: one purpose being to act as a safety brake hanger, affording a second means of support for the brake shoe assembly in the event of failure of the brake lever 50 to support the brake shoe assembly; the other purpose being to aid in maintaining the brake shoe assembly in radial alignment with the wheel 16 so that the coengaging surfaces of the brake shoe and wheel are maintained in substantially parallel relationship. This is made possible by the location of the pin 70 relative to the pin 54 in the manner previously described, wherein the parallel linkage arrangement is provided. Inasmuch as truck frame 10 is normally resiliently supported (in any conventional manner, not shown) on the wheel and axle assemblies, there is bound to be some vertical deflection of the wheel and axle assemblies relative to the truck frame. The function of the slotted pivotal connection between the brake lever of each brake arrangement and its related brake head is to accommodate limited lineal movement between the brake shoe assembly and the brake lever in order to permit a slight degree of rotation of the brake shoe assembly relative to the axis of the related wheel as the wheel deflects vertically relative to the truck frame. In the absence of such a slotted connection, the parallelogram linkage would prevent such rotative movement of the brake shoe assembly, and this movement is necessary, in the event the wheel deflects, in order to prevent undue pressure being applied on one end of the brake shoe which would cause unequal wearing of the brake shoe. The primary purpose of the parallelogram linkage arrangement is to maintain the related coengaging brake shoe and wheel surfaces in substantially parallel relationship at all times in order to insure the application of pressures being distributed uniformly throughout the entire face of the brake shoe so as to avoid unequal wearing of the brake shoe.

In order to provide a means for manual actuation of the brake mechanism associated with the respective wheels of each side of the truck, there may be provided an additional hand brake linkage arrangement which is interconnected with the previously described linkage elements in the manner hereinhafter described. As best seen in FIGURE 1, the lever 50 of each brake mechanism may be provided adjacent its upper end with an upwardly extending extension 72 pivotally connected by a pin 73 to a link 74 which in turn is pivotally connected by pin 75 to the outboard extremity of a generally horizontally disposed actuating lever.

As best seen in FIGURE 2, the actuating lever associated with the right hand brake mechanism is a dead actuating lever, indicated by the numeral 76, which is fulcrumed at its inboard end by pin 77 to a mounting bracket 78 rigidly secured to the frame in any desired manner. In order to afford additional support for the frame, the bracket 78 may include a generally horizontally extending pair of shelves 79 between which the lever 76 is slidably disposed.

The actuating lever associated with the left hand brake mechanism and indicated generally at 80 is a live lever having at its inboard extremity a pivotal connection with a connecting element such as pull rod 81, the other end of which may be operatively connected with a manually operating mechanism (not shown) such as a hand brake lever disposed some place on the car body (not shown). As best seen in FIGURE 2, the pivotal connection between the inboard extremity of lever 80 and rod 81 is a lost motion connection including a pin 82, carried by the lever 80, which is slidable within a longitudinally extending slot 83 presented by the adjacent end of rod 81. The purpose of the lost motion connection is to permit the actuation of the brake by the power means previously described without movement of the manual operating mechanism associated with the rod 81. Actuating levers 76 and 80 may be interconnected intermediate their ends by a pull rod 84 pivotally connected at its opposite ends by pins 85 and 86 to the respective levers. Sliding support for live actuating lever 80 may be provided by a bracket 87 secured to the frame in any desired manner.

In the operation of the brake mechanism on one side of the truck by the hand brake linkage, it will be seen that as pull rod 81 is moved to the left, live actuating lever 80 is urged to rotate in a counterclockwise direction about pin 86 and thereby moving the upper end of left hand brake lever 50 and extension 72 to the right, whereby brake lever 50 is urged to rotate clockwise about fulcrum point 52 and carry its related brake shoe assembly 20 into engagement with the left hand wheel. As the left hand brake shoe assembly engages the left hand wheel, rotation of left hand lever 50 stops and the fulcrum point of live actuating lever 80 shifts from pin 86 to pin 75 whereby upon the further movement of operating rod 84 to the left live actuating lever 80 continues to rotate counterclockwise, about fulcrum point 75, moving the pull rod 84 to the left. As the pull rod moves to the left, it urges dead actuating lever 76 to rotate in a clockwise direction about pin 77 which action urges the upper extremity of right hand brake lever 50 and its extension 72 to move to the left. As right hand brake lever 50 rotates in a counterclockwise direction about pin 52, it moves its related brake shoe assembly 20 into engagement with the right hand wheel.

Thus, it will be seen that with the combined hand brake and power actuated linkage arrangement of each brake mechanism the brake lever 50 of each brake mechanism can be utilized for either power or manual actuation of the brake mechanism. With manual actuation the force is applied to one end of the lever, and with power actuation the force is applied to the opposite end of the lever.

Figure 5:
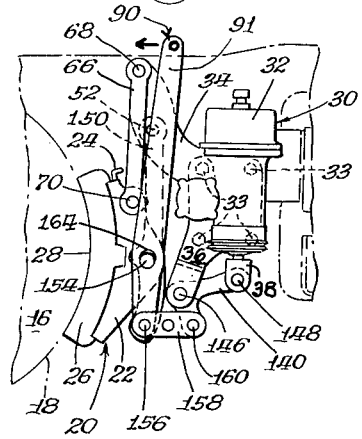

Referring now to FIGURE 5 of the drawings, it will be seen that there is provided a modified form of the hand brake linkage arrangement previously described wherein an additional hand brake operating lever, indicated generally at 90, is utilized to effect the manual actuation of the brake shoe assembly associated with each wheel and axle assembly. In FIGURE 5 there is illustrated only the brake mechanism associated with one wheel and axle assembly as it is contemplated that a similar arrangement can be applied to the adjacent wheel and axle assembly. Also the linkage system connecting the brake mechanisms on one side of the truck to each other and to the manual actuating or hand brake mechanism disposed on the car at some place remote from the truck (not shown) is not illustrated in detail as an arragement similar to that described in connection with the previous embodiment may be utilized with slight modifications in order to effect the operation of the mechanism by the movement of the upper extremity of lever 90 in the opposite direction of movement of the brake lever 50 of the previously described embodiment, as indicated by the arrow. In the first described embodiment the upper end of the brake lever was moved away from the wheel and axle assembly; whereas, in this embodiment the upper extremity of lever 90 is moved toward the wheel and axle assembly in order to effect the manual actuation of the brake mechanism.

Hand brake operating lever 90 preferably comprises a pair of lever elements 91 (one of which is shown in FIGURE 5) disposed on opposite sides of and pivotally connected at their lower extremities by pin 156 to one end of a link 158, the other end of which is pivotally connected by pin 160 to a dead bell crank cylinder lever 140 fulcrumed intermediate its ends by pin 146 to housing arm 136. The other end of lever 140 is pivotally connected by pin 148 to piston 38 of the power cylinder-slack adjuster mechanism 30. Intermediate its ends, hand brake operating lever 90 is pivotally connected to the related brake shoe assembly 20 and to the related brake lever 150 intermediate the ends of the brake lever by a common pivot pin 154. This connection is also a pin and slot connection of the type described in connection with the previous embodiment, and accommodates limited lineal movement of the brake shoe assembly relative to both lever 150 and lever 90.

In operation, as the upper extremity of lever 90 is moved to the left, as seen in FIGURE 5, it rotates in a counterclockwise direction pivoting about pin 156, thereby urging the related brake shoe assembly 20 into engagement with the adjacent wheel.

It will be noted that when the brake shoe assembly is urged into engagement with the related wheel by the power actuating mechanism, the force is applied to the lower end of brake lever 90; whereas, when the brake shoe assembly is urged into engagement with the wheel by the manual actuating means, the force is exerted on brake lever 90 at the upper end of said lever.

Figure 6:
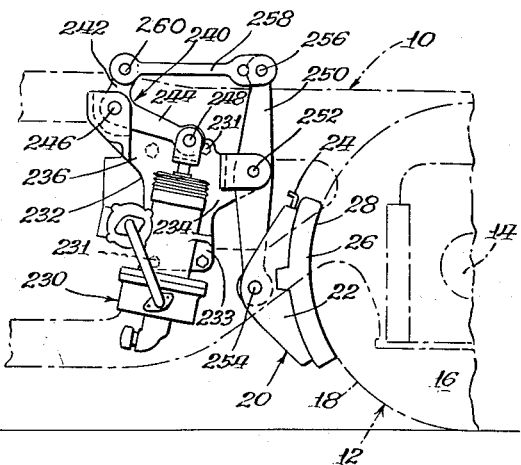

Turning now to FIGURE 6 of the drawings, it will be seen that illustrated therein is a modified form of the invention. The arrangement of this embodiment is similar to that previously described in connection with the embodiment illustrated in FIGURES 1-4 of the drawings and, where possible, the same or corresponding numerals have been employed to designate corresponding elements of the respective arrangements.

As best seen in FIGURE 6, the position of the combination power cylinder-slack adjuster assembly structure 230 is inverted from that of the structure 30 shown in FIGURE 1 and the disposition of arms 234 and 236 of housing 232 has been modified whereby all of the arms extend generally upwardly from the housing with the arms 234 extending toward the wheel and the arms 236 extending in the opposite direction.

In this embodiment, dead brake lever 250 is fulcrumed intermediate its ends by pin 252 to housing arms 234 and is pivotally connected at its lower end by pin 254 to brake shoe assembly 22. The upper extremity of brake lever 250 is pivotally connected by pin 256 to one end of a link 258, the other end of which is pivotally connected by pin 260 to arm 242 of a dead bell crank cylinder lever 240 which, in turn, is fulcrumed intermediate its ends by a pin 246 to housing arms 236 and which has its other arm 244 pivotally connected by a pin 248 to power cylinder piston rod 38.

The operation of this embodiment is similar to that of the previously described embodiment illustrated in FIGURES 1-4, except that no torque link connection is provided between the brake shoe assembly and the housing. Also, no hand brake linkage arrangement has been illustrated in connection with this embodiment, although if desired, this embodiment may be provided with a hand brake arrangement of the type previously described.

We claim:
1. In a self-contained brake arrangement for application as a unitary mechanism to a railway vehicle having a frame and a supporting wheel and axle assembly, the combination of: a generally rigid brake shoe assembly mounted at one side of the wheel with a friction face at one side thereof facing the friction surface of the wheel of the wheel and axle assembly and movable bodily toward and from the wheel for moving its friction face into and out of braking engagement with said friction surface at only one side of the wheel, means maintaining the brake shoe assembly in position with the friction face thereof facing the wheel in concentric relation thereto in all movements thereof toward and from the wheel, a break lever pivotally connected directly to the brake shoe assembly; manual actuating means; power actuating means detachably mounted on the frame and operable to support all of the remaining parts of said mechanism, and means for connecting the brake lever to the respective actuating means so that said power actuating means is operable to exert a force on the brake lever at a point located adjacent one end of said lever and said manual actuating means is operable to exert a force on the brake lever at a point spaced from said one end.

2. A self-contained brake arrangement according to claim 1, wherein said power and manual actuating means are connected to the brake lever at points located on opposite sides of the connection between the brake lever and the friction means.

3. A self-contained brake arrangement according to claim 1, wherein the brake lever is a floating lever.

4. A self-contained brake arrangement according to claim 1 wherein, the means maintaining the brake shoe assembly in the position stated, includes a pair of parallel links interconnecting the brake shoe assembly and a fixed portion of the unitary mechanism.

5. A self-contained brake arrangement according to claim 1, wherein the pivotal connection between the brake lever and the brake shoe assembly is a pin and slot connection accommodating limited lineal movement between the brake lever and brake shoe assembly.

6. A self-contained brake arrangement according to claim 1 wherein the power actuating means includes a cylinder member and a relatively movable rod extending theerefrom, and which includes a dead cylinder lever fulcrumed to the cylinder member and connected to the brake lever and rod, respectively.

7. A self-contained brake arrangement according to claim 6, wherein the cylinder lever is a bell crank lever fulcrumed intermediate its ends to the power cylinder member.

8. A self-contained brake arrangement according to claim 6, wherein the brake lever is pivotally connected intermediate its ends to the brake shoe assembly and is connected at its lower end to the cylinder lever.

References Cited in the file of this patent

UNITED STATES PATENTS

| | | |
|---|---|---|
| 754,419 | Brown | Mar. 15, 1904 |
| 1,386,853 | Elliott | Aug. 9, 1921 |
| 1,456,632 | Elliott | May 29, 1923 |
| 1,572,872 | Alben | Feb. 16, 1926 |
| 1,701,505 | Perrot | Feb. 12, 1929 |
| 1,939,196 | Clouser | Dec. 12, 1933 |
| 2,060,874 | La Brie | Nov. 17, 1936 |
| 2,112,530 | Holloway | Mar. 29, 1938 |
| 2,416,871 | Gaenssle | Mar. 4, 1947 |
| 2,503,489 | James | Apr. 11, 1950 |
| 2,913,071 | Mueller | Nov. 17, 1959 |

FOREIGN PATENTS

| | | |
|---|---|---|
| 513,240 | Canada | May 31, 1955 |

UNITED STATES PATENT OFFICE
CERTIFICATION OF CORRECTION

Patent No. 3,009,544                          November 21, 1961

Bernard Maloney et al.

It is hereby certified that error appears in the above numbered patent requiring correction and that the said Letters Patent should read as corrected below.

In the heading to the drawings, Sheets 1 and 2, line 2, and in the heading to the printed specification, line 2, title of invention, for "UNIT BRAKE ARRANGEMENT", each occurrence, read -- SELF-CONTAINED BRAKE ARRANGEMENT --; column 2, line 5, for "detachable" read -- detachably --; line 61, for "th" read -- the --; column 3, line 66, for "hereinhafter" read -- hereinafter --; column 6, line 15, for "break" read -- brake --; line 45, for "theerefrom" read -- therefrom --; line 65, for "1,939,196" read -- 1,939,106 --.

Signed and sealed this 17th day of April 1962.

(SEAL)
Attest:

ESTON G. JOHNSON                           DAVID L. LADD
Attesting Officer                              Commissioner of Patents